(12) United States Patent
Ma et al.

(10) Patent No.: US 11,803,720 B2
(45) Date of Patent: Oct. 31, 2023

(54) METHODS AND APPARATUS TO DETERMINE BARCODE DECODING PARAMETERS FOR A PLURALITY OF BARCODES IN AN IMAGE

(71) Applicant: ZEBRA TECHNOLOGIES CORPORATION, Lincolnshire, IL (US)

(72) Inventors: Peizheng Ma, East Setauket, NY (US); Eugene B. Joseph, Coram, NY (US); Dongqing Chen, East Setauket, NY (US)

(73) Assignee: Zebra Technologies Corporation, Lincolnshire, IL (US)

(*) Notice: Subject to any disclaimer, the term of this patent is extended or adjusted under 35 U.S.C. 154(b) by 20 days.

(21) Appl. No.: 17/587,851

(22) Filed: Jan. 28, 2022

(65) Prior Publication Data
US 2023/0274114 A1 Aug. 31, 2023

(51) Int. Cl.
*G06K 7/14* (2006.01)

(52) U.S. Cl.
CPC ......... *G06K 7/1486* (2013.01); *G06K 7/1417* (2013.01); *G06K 7/1443* (2013.01); *G06K 7/1452* (2013.01); *G06K 7/1478* (2013.01)

(58) Field of Classification Search
CPC ... G06K 7/1486; G06K 7/1417; G06K 7/1443
USPC ................................... 235/462.09
See application file for complete search history.

(56) References Cited

U.S. PATENT DOCUMENTS

| | | | | |
|---|---|---|---|---|
| 6,110,044 A | * | 8/2000 | Stern | G07F 17/32 463/16 |
| 6,565,005 B1 | * | 5/2003 | Wilz, Sr. | G06K 7/10811 235/472.01 |
| 11,259,960 B2 | * | 3/2022 | Charles | A61B 90/92 |
| 2006/0091216 A1 | | 5/2006 | Page | |
| 2008/0029602 A1 | * | 2/2008 | Burian | G06K 7/14 235/462.07 |

(Continued)

OTHER PUBLICATIONS

Zebra. Barcode Input DataWedge 8.0. Zebra Webpage, Oct. 23, 2020 [retrieved on Mar. 16, 2023] Retrieved from the Internet <https://web.archive.org/web/20201023032934/https://techdocs.zebra.com/datawedge/8-0/guide/input/barcode/>; entire document, especially p. 1, para 4, p. 1, para 11, p. 11, para 2, p. 11, para 6-7, para 9, p. 5, para 10, p. 8, para 5.

(Continued)

*Primary Examiner* — Allyson N Trail
(74) *Attorney, Agent, or Firm* — Yuri Astvatsaturov

(57) ABSTRACT

Methods and apparatus to determine barcode decoding parameters for a plurality of barcodes in an image are disclosed. An example method includes: obtaining image data representing an image including a plurality of barcodes; decoding a first barcode of the plurality of barcodes from the image data; determining a set of barcode decoding parameters used to successfully decode the first barcode; determining whether the plurality of barcodes encoded using at least one of a same barcode size, a same module size, or a same barcode format; and when the plurality of barcodes are encoded using at least one of the same barcode size, the same module size, or the same barcode format, attempting to decode all remaining barcodes of the plurality of barcodes from the image data using first the set of barcode decoding parameters.

20 Claims, 10 Drawing Sheets

(56) References Cited

U.S. PATENT DOCUMENTS

2022/0350982 A1* 11/2022 West .................. G06K 7/1417

OTHER PUBLICATIONS

Dynamsoft. Scan Multiple Barcodes and QR Codes at once. Dynamsoft Webpage. Oct. 21, 2021 [retrieved on Mar. 16, 2023] Retrieved from the Internet <https://www.dynamsoft.com/blog/insights/scan-multiple-barcodes-and-qr-codes-at-once/>; entire document.
Zebra. Zebra Developers Build Your Edge. Zebra Developer Portal. Aug. 19, 2020 [retrieved on Mar. 16, 2023] Retrieved from the Internet <http://darryncampbell.co.uk/assets/slides/20200819_devtalk_datawedge_8x.pdf>; entire document.
International Search Report and Written Opinion for International Application No. PCT/US2023/11589 dated May 15, 2023.

\* cited by examiner

300

305   306   307   308

400

METHODS AND APPARATUS TO DETERMINE BARCODE DECODING PARAMETERS FOR A PLURALITY OF BARCODES IN AN IMAGE

BACKGROUND

An image may contain more than one barcode that a barcode decoder is supposed to locate and decode. The barcodes may have the same or different barcode sizes and/or barcode formats. Under such circumstances, the location and decoding of the barcodes may be slow because the barcode decoder considers or searches for possible barcode decoding parameters, barcode sizes, and/or barcode formats for each barcode.

SUMMARY

To reduce or eliminate some or all of these, or other problems of conventional barcode decoding, example methods, systems and articles of manufacture for determining barcode decoding parameters for a plurality of barcodes in an image are disclosed.

In an embodiment, the present invention is a method including: obtaining, from an image sensor, image data representing an image of an environment appearing within a field of view of an imaging device that includes the image sensor, wherein a plurality of barcodes appear in the image; decoding a first barcode of the plurality of barcodes from the image data; determining a set of barcode decoding parameters used to successfully decode the first barcode; determining whether the plurality of barcodes appearing in the image are encoded using at least one of a same barcode size, a same module size, or a same barcode format; and when the plurality of barcodes appearing in the image are encoded using at least one of the same barcode size, the same module size, or the same barcode format, attempting to decode all remaining barcodes of the plurality of barcodes from the image data using first the set of barcode decoding parameters.

In a variation of this embodiment, the set of barcode decoding parameters includes all configurable decoding parameters used to successfully decode the first barcode.

In a variation of this embodiment, the set of barcode decoding parameters includes at least a pixels per module, a barcode format, and an image resolution.

In a variation of this embodiment, the method further comprises, when not all of the plurality of barcodes appearing in the image are encoded using at least one of the same barcode size, the same module size, or the same barcode format, attempting to decode the remaining barcodes of the plurality of barcodes from the image data using one or more other sets of barcode decoding parameters.

In a variation of this embodiment, the method further comprises determining whether the plurality of barcodes appearing in the image are encoded using at least one of the same barcode size, the same module size, or the same barcode format by receiving a configuration input indicating whether the plurality of barcodes appearing in the image are encoded using at least one of the same barcode size, the same module size, or the same barcode format.

In a variation of this embodiment, the configuration input is received via a user interface.

In a variation of this embodiment, the method further comprises: determining whether the plurality of barcodes appearing in the image are encoded using at least one of the same barcode size, the same module size, or the same barcode format by: attempting to decode a subset of the plurality of barcodes using first the set of barcode decode parameters; determining whether the subset of the plurality of barcodes were each successfully decoded using the set of barcode decode parameters; and when the subset of the plurality of barcodes were each successfully decoded using the set of barcode decode parameters, determining that the plurality of barcodes appearing in the image are encoded using at least one of the same barcode size, the same module size, or the same barcode format, wherein the remaining barcodes of the plurality of barcodes excludes the first barcode and the subset of the plurality of barcodes.

In a variation of this embodiment, the method further comprises, when not all of the subset of barcodes can be successfully decoded with the set of barcode decoding parameters, determining that not all of the plurality of barcodes appearing in the image are encoded using at least one of the same barcode size, the same module size, or the same barcode format.

In a variation of this embodiment, the method further comprises, when not all of the plurality of barcodes appearing in the image are encoded using at least one of the same barcode size, the same module size, or the same barcode format, attempting to decode the remaining barcodes of the plurality of barcodes from the image data using one or more other sets of barcode decoding parameters.

In another embodiment, the present invention is an apparatus comprising an interface, a barcode decoder, and a processor. The interface configured to receive, from an image sensor, image data representing an image of an environment appearing within a field of view of the image sensor. The processor configured to: determine whether a plurality of barcodes appearing in the image are encoded using at least one of a same barcode size, a same module size, or a same barcode format; cause the barcode decoder to decode a first barcode of the plurality of barcodes from image data, and determine a set of barcode decoding parameters used to successfully decode the first barcode; and when the plurality of barcodes appearing in the image are encoded using at least one of the same barcode size, the same module size, or the same barcode format, cause the barcode to attempt to decode all remaining barcodes of the plurality of barcodes from the image data starting with the set of barcode decoding parameters.

In a variation of this embodiment, the set of barcode decoding parameters includes all configurable decoding parameters used to successfully decode the first barcode.

In a variation of this embodiment, the set of barcode decoding parameters includes at least a pixels per module, a barcode format, and an image resolution.

In a variation of this embodiment, the processor is configured to: determine whether the plurality of barcodes appearing in the image are encoded using at least one of the same barcode size, the same module size, or the same barcode format in response to receiving a configuration input indicating whether the plurality of barcodes appearing in the image are encoded using at least one of the same barcode size, the same module size, or the same barcode format; and cause the barcode to attempt to decode all remaining barcodes of the plurality of barcodes from the image data starting with the set of barcode decoding parameters by providing the indication to the barcode decoder In yet another embodiment of the present invention, a non-transitory, computer-readable, storage medium stores computer-readable instructions that, when executed by one or more processors, cause a barcode decoder to: obtain, from an image sensor, imaging data representing an image of an environment appearing within a field of view of the image sensor; determine whether a plurality of barcodes appearing in the image are encoded using at least one of a same barcode size, a same module size, or a same barcode format; decode a first barcode of the plurality of barcodes from the image data; determine a set of barcode decoding parameters used to successfully decode the first barcode; and when the plurality of barcodes appearing in the image are encoded using at least one of the same barcode size, the same module size, or the same barcode format, attempt to decode all remaining barcodes of the plurality of barcodes from the image data using first the set of barcode decoding parameters.

In a variation of this embodiment, the set of barcode decoding parameters includes all configurable decoding parameters used to successfully decode the first barcode.

In a variation of this embodiment, the set of barcode decoding parameters includes at least a pixels per module, a barcode format, and an image resolution.

In a variation of this embodiment, the instructions, when executed by the one or more processors, cause the barcode decoder to, when not all of the plurality of barcodes appearing in the image are encoded using at least one of the same barcode size, the same module size, or the same barcode format, attempt to decode the remaining barcodes of the plurality of barcodes from the image data using one or more other sets of barcode decoding parameters.

In a variation of this embodiment, the instructions, when executed by the one or more processors, cause the barcode decoder to determine whether the plurality of barcodes appearing in the image are encoded using at least one of the same barcode size, the same module size, or the same barcode format by receiving a configuration input indicating whether the plurality of barcodes appearing in the image are encoded using at least one of the same barcode size, the same module size, or the same barcode format.

In a variation of this embodiment, the instructions, when executed by the one or more processors, cause the barcode decoder to determine whether the plurality of barcodes appearing in the image are encoded using at least one of the same barcode size, the same module size, or the same barcode format by: attempting to decode a subset of the plurality of barcodes using the set of barcode decode parameters; determining whether the subset of the plurality of barcodes were each successfully decoded using the set of barcode decode parameters; and when the subset of the plurality of barcodes were each successfully decoded using the set of barcode decode parameters, determining that the plurality of barcodes appearing in the image are encoded using at least one of the same barcode size, the same module size, or the same barcode format, wherein the remaining barcodes of the plurality of barcodes excludes the first barcode and the subset of the plurality of barcodes.

In a variation of this embodiment, the instructions, when executed by the one or more processors, cause the barcode decoder to, when not all of the plurality of barcodes appearing in the image are encoded using at least one of the same barcode size, the same module size, or the same barcode format, attempt to decode the remaining barcodes of the plurality of barcodes from the image data using one or more other sets of barcode decoding parameters.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
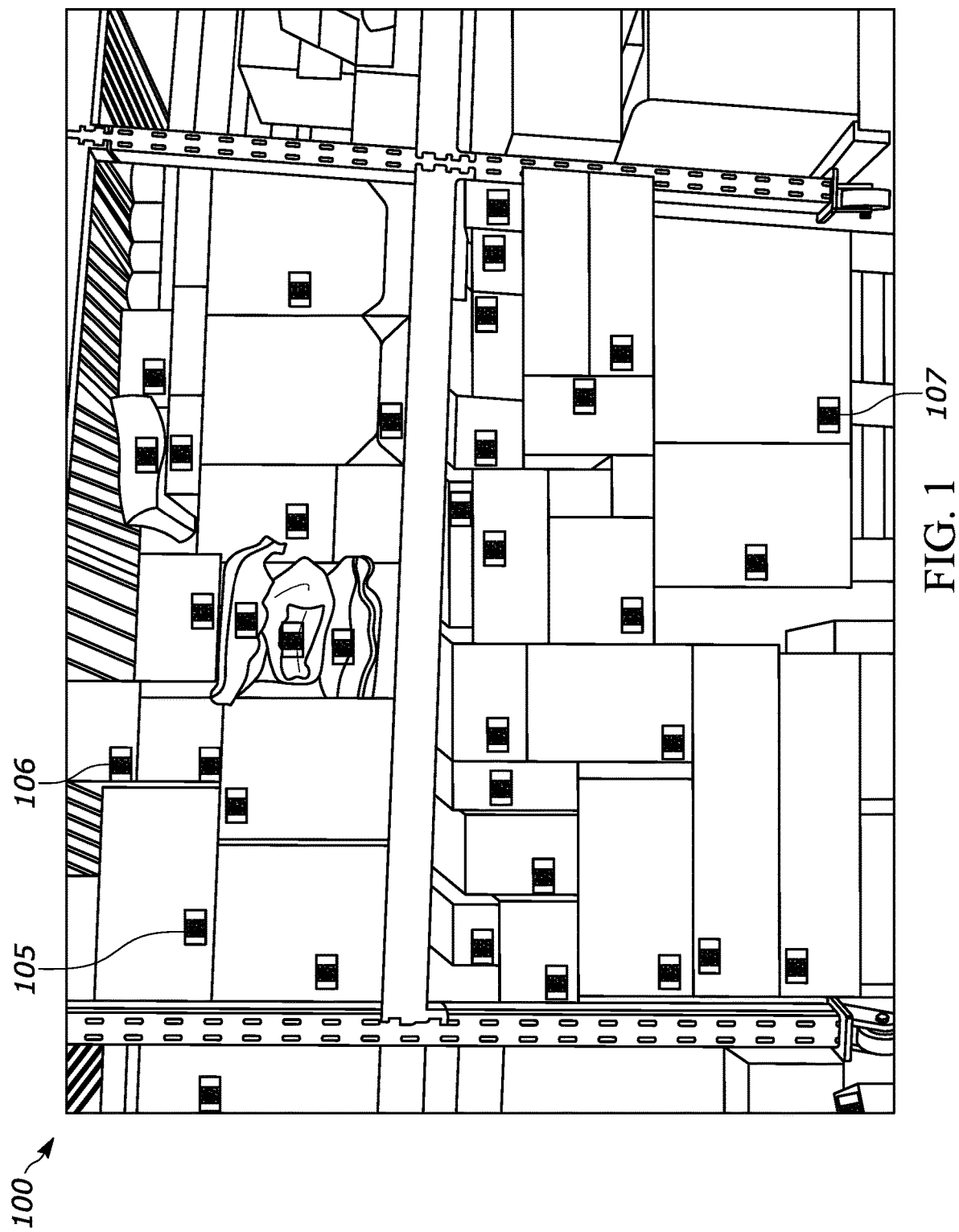
FIG. 1 is an example image of a plurality of barcodes encoded using the same barcode size, the same module size, and the same barcode format.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

There are specialized applications of barcode decoding in which an image contains a plurality of barcodes that all have the same barcode size, the same module size, and/or the same barcode format. In such applications, the decoding performance of a barcode decoder can be substantially improved when the barcode size, the module size, and/or the barcode format are determined as early as possible in the decoding process. The applicable barcode decoding parameters for one of the barcodes can then be identified or determined, and used to locate and decode all the other barcodes. By knowing the barcode decoding parameters, the barcode decoder can more accurately and more quickly locate the other barcodes, and can alleviate the conventional and typically slow barcode-by-barcode search for barcode decoding parameters for the other barcodes.

Example barcode formats include one-dimensional (1D) barcodes, such as Code 39 barcodes, Code 128 barcodes, interleaved 2 of 5 barcodes, universal product code (UPC) barcodes, international article number (IAN) barcodes, and PDF 417 barcodes, and two-dimensional (2D) barcodes, such as data matrix barcodes, quick response (QR) code barcodes, Aztec barcodes, DotCode barcodes, grid matrix barcodes, or the like. Example barcode decoding parameters include a pixels per module (PPM), a barcode format, a barcode width-to-height ratio, a limit of a contour walker steps, a barcode type, and an image resolution.

FIG. 1 is an example image 100 for a first example specialized barcode decoding application in which substantially similar barcodes are used in a storage room to identify a plurality of boxes on racks. A plurality of barcodes (three of which are designated with reference numerals 105, 106, and 107) that appear in the image 100 are all encoded using the same barcode size, the same module size, and the same barcode format.

Figure 2:
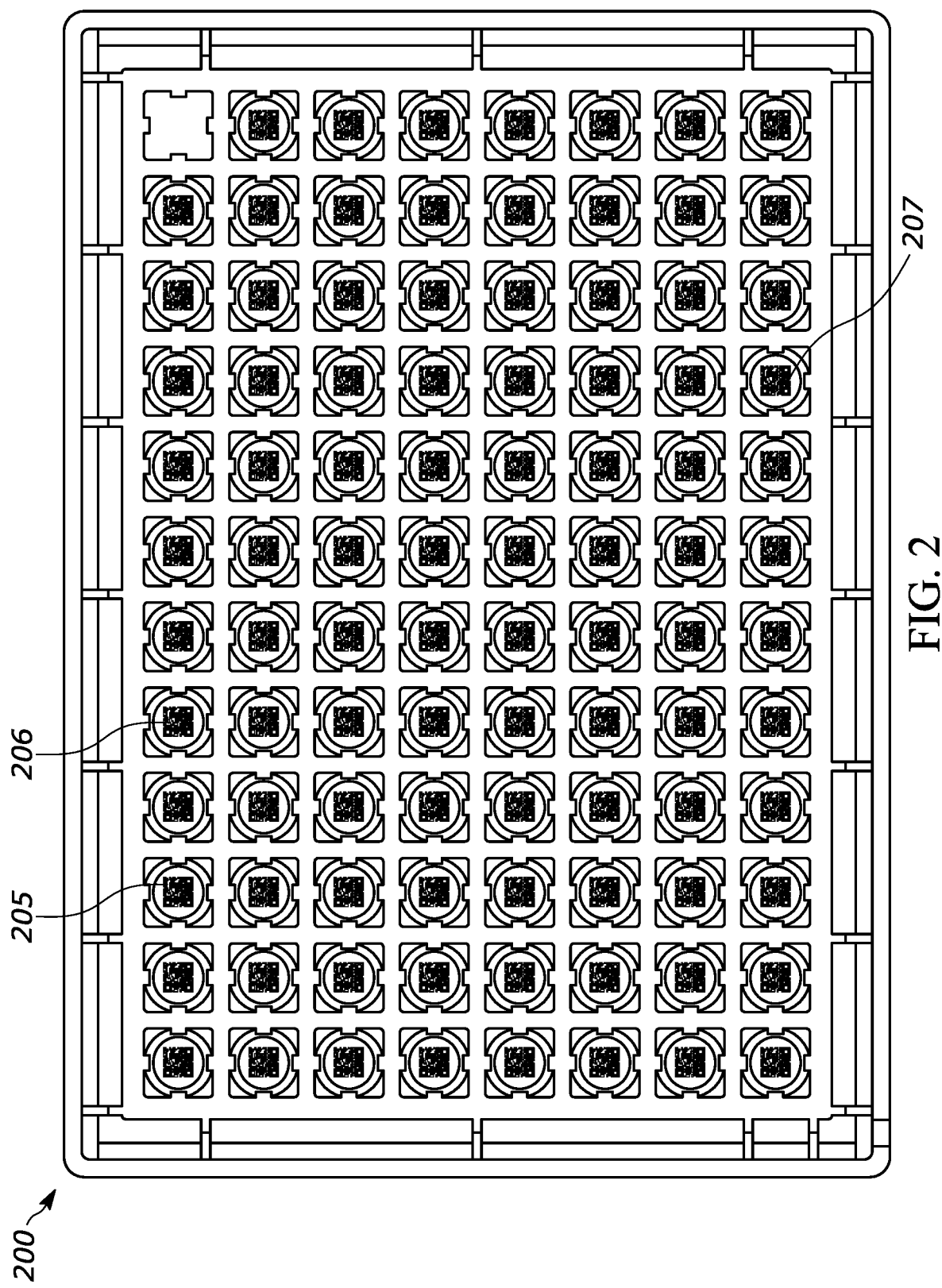
FIG. 2 is another example image of a plurality of barcodes encoded using the same barcode size, the same module size, and the same barcode format.

FIG. 2 is another example image 200 for another example specialized barcode decoding application in which substantially similar barcodes are used to identify a plurality of tubes containing specimens stored in a rack. A plurality of barcodes (three of which are designated with reference numerals 205, 206, and 207) that appear in the image 200 are encoded using the same barcode size, the same module size, and the same barcode format.

Figure 3:
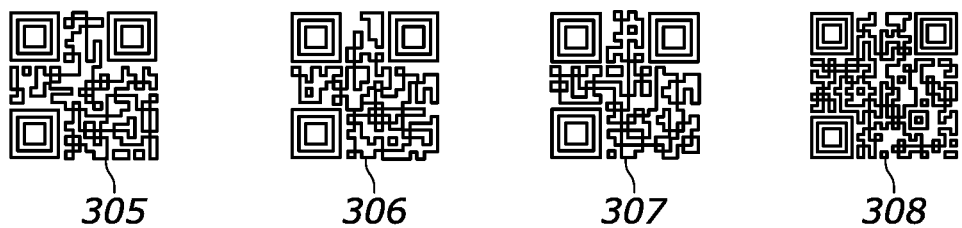
FIG. 3 is yet another example image of a plurality of barcodes encoded using the same barcode size, the same module size, and the same barcode format.

FIG. 3 is yet another example image 300 for another example specialized barcode decoding application in which substantially similar barcodes are constituent or sub-barcodes of a structured, appended, or linked barcode. A plurality of barcodes (four of which are designated with reference numerals 305, 306, 307, and 308) that appear in the image 300 are encoded using the same barcode size, the same module size, and the same barcode format. In the example shown, encoded data is split over the barcodes 305-308.

Reference will now be made in detail to non-limiting examples, some of which are illustrated in the accompanying drawings.

Figure 4:
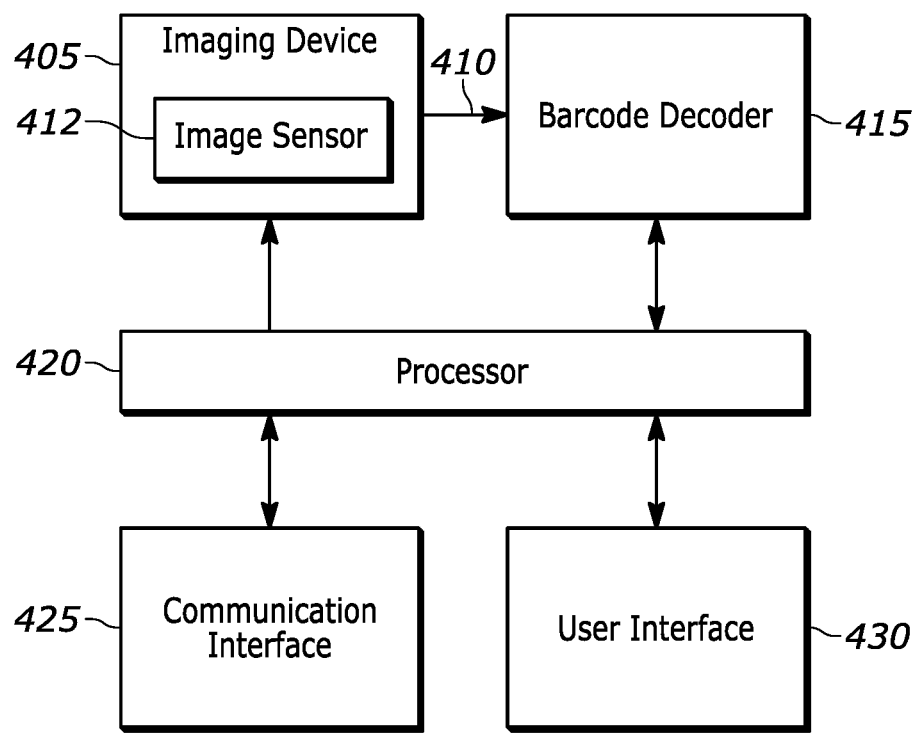
FIG. 4 is a block diagram of an example system for determining barcode decoding parameters for a plurality of barcodes in an image, in accordance with embodiments of the disclosure.

FIG. 4 illustrates an example system 400 for determining barcode decoding parameters for a plurality of barcodes appearing in one or more images. While the following description refers to determining barcode decoding parameters for a plurality of barcodes, one of ordinary skill in the art will recognize the disclosed devices, systems, methods, etc. may be used to determine decoding parameters for other types of indicia (e.g., direct product markings).

The example system 400 includes any number and/or type(s) of example image devices 405 configured to capture images 410. The imaging device(s) 405 capture, using an image sensor 412 having a plurality of photosensitive elements, image data representing an image 410 of an environment in which the system 400 is operating that falls within a field of view (FOV) the imaging device 405. Example image data includes data representing the outputs of the plurality of photosensitive elements, that is, the pixels of the image sensor 412.

The system 400 includes any number and/or type(s) of example barcode decoders 415 configured to locate and decode barcodes appearing in an image 410 to determine the payload of the barcodes. When the barcodes in one or more images 410 are encoded using the same barcode size, the same module size, and/or the same barcode format, the barcode decoder 415 determines a set of barcode decoding parameters that can be used to locate and decode all the barcodes from image data representing the one or more image(s) 410. When not all of the plurality of barcodes appearing in the one or more images 410 are encoded using the same barcode size, the same module size, and/or the same barcode format, the barcode decoder 415 is configured to try to decode the barcodes from the image data using one or more other sets of barcode decoding parameters. Example barcode decoding parameters include a PPM, a barcode format, a barcode width-to-height ratio, a limit of a contour walker steps, a barcode type, and an image resolution. An example set of barcode decoding parameters includes all parameters needed to decode a barcode. An example set of barcode decoding parameters includes at least a PPM, a barcode format, and an image resolution.

Figure 5:
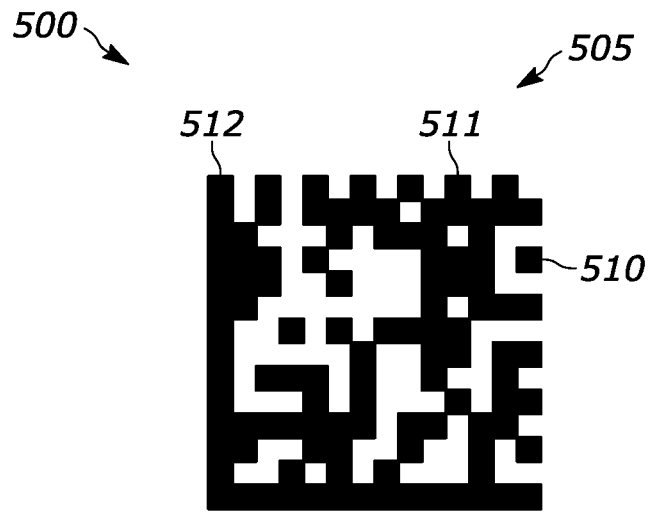
FIG. 5 is an image of an example two-dimensional (2D) barcode.

FIG. 5 is an example image 500 of an example 2D barcode 505 having a plurality of modules (three of which are designated with reference numerals 510, 511, and 512). In FIG. 5, the modules 510-112 are blocks that form the 2D barcode 505. In other types of barcodes, the modules may be lines, dots, or rectangles. The barcode decoder 415 can determine the PPM for the barcode 505 based upon the resolution of the image 500. That is, by determining the number of pixels that represent the width and/or the height of each module 510-112.

Returning to FIG. 4, once a first barcode is successfully decoded from the image data representing one or more images 410, the barcode decoder 415 can determine the PPM of the barcode, and use the PPM to decode other barcodes from the image data. Moreover, the barcode decoder 415 can determine the size of the other barcodes (e.g., expressed in numbers of pixels) based upon the PPM and the size of the decoded barcode, and use the determined barcode size to locate the other barcodes in the image data. In some examples, a barcode format for the barcodes is received a priori from, for example, a processor 420, and used to decode the barcodes. Alternatively, the barcode decoder 415 can determine the barcode format during decoding of the first barcode.

When barcodes are to be decoded in an image sequence captured using video capture or burst mode capture at a high frames per second rate, the barcode decoder 415 can use the PPM information from one image to determine the PPM for another image, because the change between two adjacent images should be small when the image sequence is thus captured.

The barcode decoder 415 can also use the PPM to determine if image resolution is appropriate. For example, a method used by the barcode decoder 415 to decode a particular type of barcode may have a PPM range in which the method works best. If the image resolution is determined to be too high or too low, the barcode decoder 415 can change the image resolution by, for example, downsampling the current image 410 or causing the imaging device 405 to capture another image 410 using a higher image resolution. In some examples, when an image 410 is captured, multiple images 410 at different image resolutions are captured in sequence such that a barcode decoder 415 can select, based upon PPM, the one of the captured images having a desired image resolution for decoding.

In some examples, the barcode decoder 415 determines whether the barcodes in an image 410 are encoded using the same barcode size, the same module size, and the same barcode format by detecting or determining whether a portion or subset of the barcodes in the image 410 can be successfully decoded using the same set of barcode decoding parameters. Alternatively, the barcode decoder 415 determines that the barcodes in an image 410 are encoded using the same barcode size, the same module size, and the same barcode format when barcodes in a previously decoded image 410 were successfully decoded using the same set of barcode decoding parameters. Alternatively, an indication of whether the barcodes in an image 410 are encoded using the same barcode size, the same module size, and the same barcode format is received from, for example, the processor 420.

Example barcode decoders 415 include a programmable processor, programmable controller, graphics processing unit (GPU), digital signal processor (DSP), etc. capable of executing instructions to, for example, implement operations of the example methods described herein. Additionally and/or alternatively, the barcode decoder 415 may include one or more logic circuits capable of, for example, implementing operations of the example methods described herein without executing software or instructions.

The example system 400 includes one or more example processors 420 to generally control the system 400, and to provide the decoded payloads of barcodes decoded by the barcode decoder 415 to, for example, a host system via a communication interface 425. In some examples, the processor 420 receives an indication of whether the barcodes in an image 410 are encoded using the same barcode size, the same module size, and the same barcode format from a user via a user interface 430, and/or the host system via the communication interface 425, and provides the indication to the barcode decoder 415. The processor 420 can also receive an indication of a barcode format for the barcodes in an image 410 from a user via a user interface 430, and/or the host system via the communication interface 425, and provide the barcode format to the barcode decoder 415 for use in decoding the barcodes.

Example processors 420 include a programmable processor, programmable controller, GPU, DSP, etc. capable of executing instructions to, for example, implement operations of the example methods described herein. Additionally and/or alternatively, the processor 420 may include one or more logic circuits capable of, for example, implementing operations of the example methods described herein without executing software or instructions. In some examples, the processor 420 and the barcode decoder 415 are implemented by the same device. An example logic circuit 1200 that may be used to implement the system 400 is discussed below in connection with FIG. 12.

Figure 6:
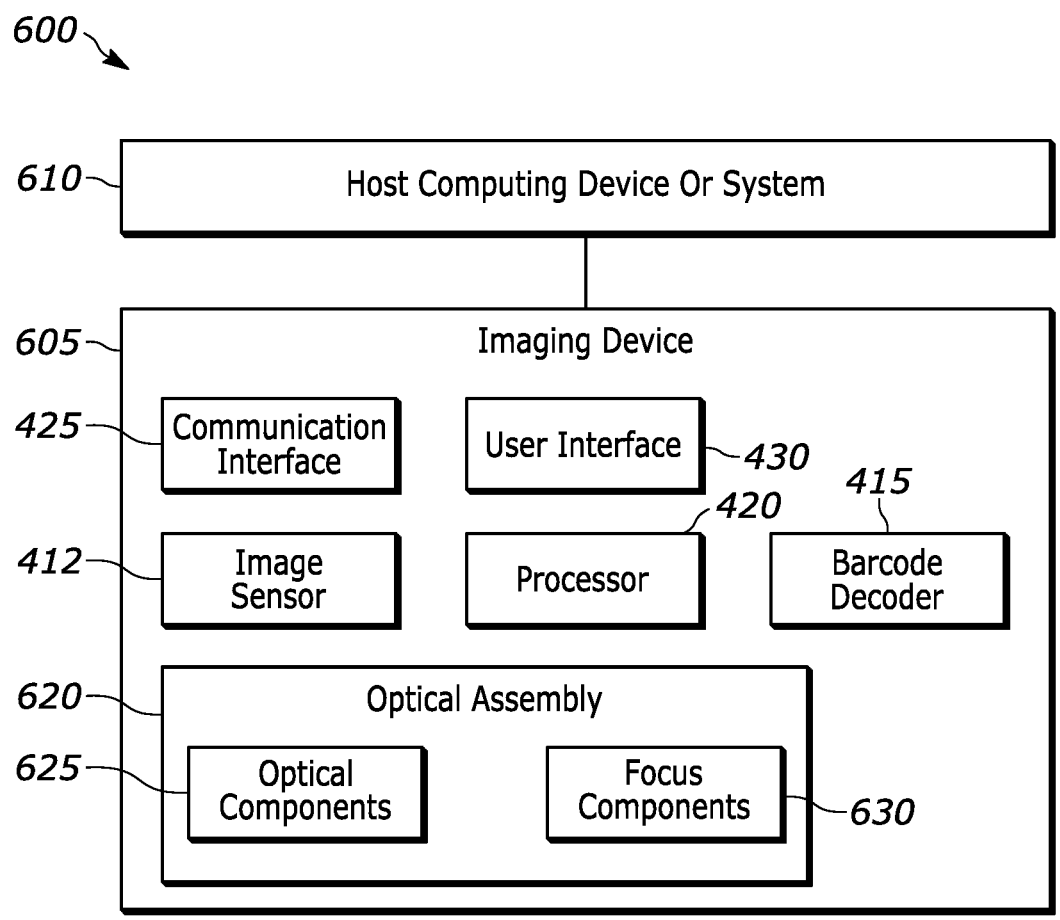
FIG. 6 is a block diagram of an example imaging device that may be used to implement the example system of FIG. 4 for determining barcode decoding parameters for a plurality of barcodes in an image, in accordance with embodiments of the disclosure.

FIG. 6 is a block diagram of an example system 600 having an imaging device 605 that may be configured to implement the system 400 of FIG. 4, and provides the payload of decoded barcodes, indicia, direct product markings (DPMs), etc. to a host computing device or system 610. The imaging device 605 may be, for example, a handheld scanner that may operate in a handheld and/or handsfree mode, a bioptic scanner, a machine vision system, a slot scanner, or the like that are configured to decode barcodes and provide the payload of the decoded barcodes to the host computing device or system 610 via, for example, the communication interface 425. The imaging device 605 may also be, for example, a general-purpose computing device (e.g., a computer, a laptop, a mobile device such as a mobile phone, a tablet, etc.), a headset or other wearable device (e.g., an augmented reality headset, etc.), or any other type of computing device or system having a communication interface and a camera for capturing images, and configurable to process such images for determining barcode decoding parameters for a plurality of barcodes in an image, and locating and decoding the barcodes. An example logic circuit 1200 that may be used to implement the imaging device 605 is discussed below in connection with FIG. 12. The host computing device or system 610 may be a point-of-sale (POS) station, a point-of-transaction station, an inventory management system, etc.

The example imaging device 605 includes the image sensor(s) 412 having a plurality of photosensitive elements to capture image data representing images of an environment in which the imaging device 605 is operating that falls within a FOV of the imaging device 605, the processor 420, and the barcode decoder 415 of FIG. 4. In some examples, the processor 420 of FIG. 6 controls the overall operation of the imaging device 605. For example, the processor 420 may control the image sensor 412 to capture one or more images; control the barcode decoder 415 to determine a set of barcode decoding parameters for decoding a plurality of barcodes in the one or more images, and attempt decode the plurality of barcodes using first (i.e., starting with) the determined set of barcode decoding parameters; provide barcode payloads of decoded barcodes to the host computing device or system 710; execute an operating system; provide one or more user interfaces 430; respond to user inputs received via the communication interface 425 and/or the user interface 430; execute one or more applications on behalf of a user; etc. In some examples, the processor 420 and the barcode decoder 415 are implemented by the same device.

The imaging device 605 includes an optical assembly 620 to form images of an environment in a FOV on a surface of the image sensor 412. The optical assembly 620 may include any number and/or type(s) of optical elements and/or components 625 including, for example, one or more lenses, filters, focus motors, apertures, lens holder, liquid lenses, or any other components and/or optical elements.

In some examples, the optical assembly 620 includes any number and/or type(s) of focus components 630 (e.g., motors, liquid lenses, etc.) to focus the optical assembly 620 on, for example, a barcode. In some examples, some of the focus components 630 (e.g., an autofocus controller) are implemented by the processor 420. Alternatively, the optical assembly 620 is a fixed-focus optical assembly.

While not shown in FIG. 6 for clarity of illustration, the imaging device 605 may include an aiming pattern generator configured to provide an illuminated aiming pattern to assist a user in directing the imaging device 605 toward a barcode of interest, and/or an illumination generator to emit light in a FOV to, for example, facilitate autofocus and/or improve the quality of image data captured by the image sensor 412.

Figure 7:
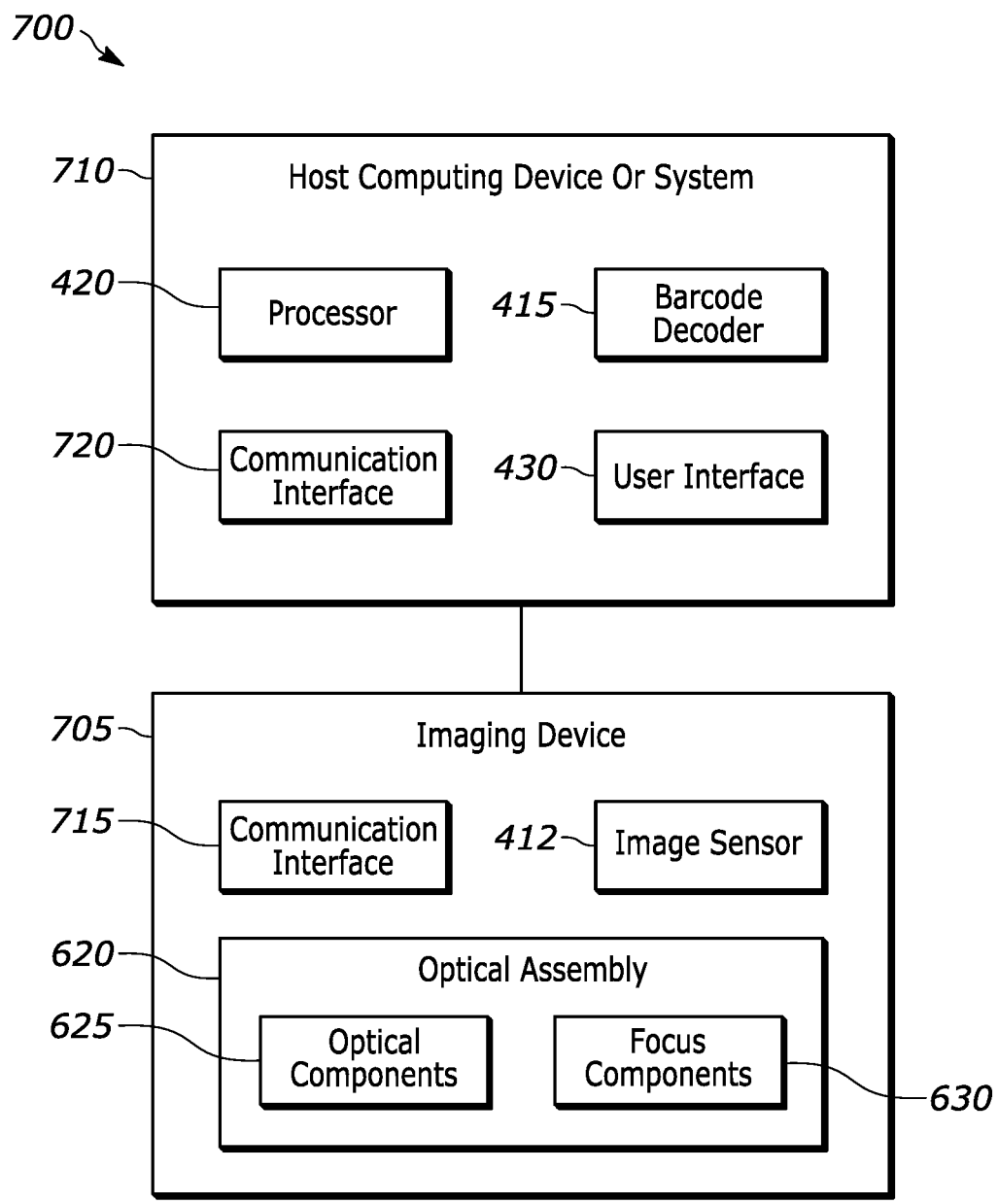
FIG. 7 is a block diagram of an example system having a computing device and an imaging device that may be used to implement the example system of FIG. 4 for determining barcode decoding parameters for a plurality of barcodes in an image, in accordance with embodiments of the disclosure.

FIG. 7 is a block diagram of another example system 700 having an imaging device 705 for capturing and providing images; and a host computing device or system 710 for determining barcode decoding parameters for a plurality of barcodes in one or more images, and locating and decoding the plurality of barcodes using the determined barcode decoding parameters. The imaging device 705 and the host computing device or system 710 can together implement the system 400 of FIG. 4. The imaging device 705 may provide captured image data to the host computing device or system 710 via respective communication interfaces 715 and 720. The imaging device 705 may be, for example, a handheld scanner that may operate in a handheld and/or handsfree mode, a bioptic scanner, a machine vision system, a slot scanner, or the like that are configured to provide captured images to the host computing device or system 710. The imaging device 705 may also be, for example, a general-purpose computing device (e.g., a computer, a laptop, a mobile device such as a mobile phone, a tablet, etc., a headset or other wearable device (e.g., an augmented reality headset, etc.), or any other type of computing device or system) having a communication interface and a camera for capturing images, and configurable to provide images to the host computing device or system 710. As shown in FIG. 7, the imaging device 705 includes the image sensor(s) 412 of FIG. 6.

The example host computing device or system 710 includes the processor 420 and the barcode decoder 415 of FIG. 4. The processor 420 of FIG. 7 controls the overall operation of the host computing device or system 710. For example, the processor 420 may control the reception of captured images from the imaging device 705; control the barcode decoder 415 to determine a set of barcode decoding parameters for decoding a plurality of barcodes in one or more received images, and attempt to decode the plurality of barcodes using first the determined set of barcode decoding parameters; execute an operating system; provide one or more user interfaces 430; respond to user inputs received via the user interface 430; execute one or more applications on behalf of a user; etc. The host computing device or system 610 may be a point-of-sale (POS) station, a point-of-transaction station, an inventory management system, etc. An example logic circuit 1200 that may be used to implement the imaging device 705 and/or the host computing device or system 710 is discussed below in connection with FIG. 12. In some examples, the processor 420 and the barcode decoder 415 are implemented by the same device.

Figure 8:
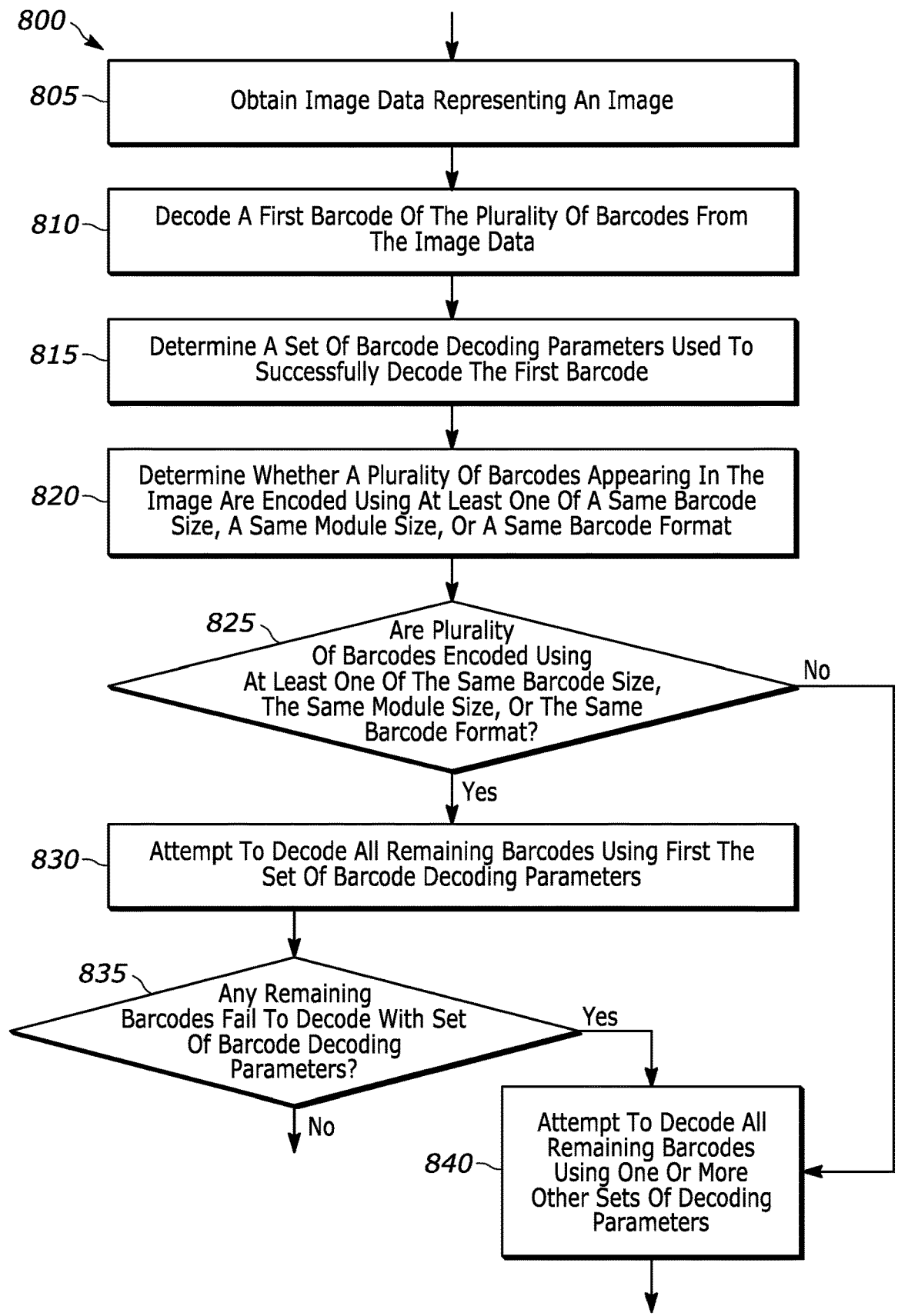
FIG. 8 is a flowchart representative of an example method, hardware logic, machine-readable instructions, or software for determining barcode decoding parameters for a plurality of barcodes in an image, in accordance with embodiments of the disclosure.

FIG. 8 is a flowchart 800 representative of example processes, methods, software, machine-readable instructions, etc. that may be implemented by the system 400 of FIG. 4, the imaging device 605 of FIG. 6, and/or the system 700 of FIG. 7 to determine a set of barcode decoding parameters for decoding a plurality of barcodes appearing in an image. Any or all of the blocks of FIG. 8 may be an executable program or portion(s) of an executable program embodied in software and/or machine-readable instructions stored on a non-transitory, machine-readable storage medium for execution by one or more processors such as the processor 1202 of FIG. 12. Additionally and/or alternatively, any or all of the blocks of FIG. 8 may be implemented by one or more hardware circuits structured to perform the corresponding operation(s) without executing software or instructions.

The flowchart 800 of FIG. 8 begins at block 805 with a barcode decoder, such as the barcode decoder 415, obtaining image data representing one or more images of an environment in a FOV in which a plurality of barcodes appears. The image data may be obtained, directly or indirectly, from the image sensor 412 and/or from the imaging device 705.

The barcode decoder 415 decodes a first barcode from the image data (block 810), and determines the set of barcode decoding parameters that were used to successfully decode the barcode (block 815). Example barcode decoding parameters include a PPM, a barcode format, a barcode width-to-height ratio, a limit of a contour walker steps, a barcode type, and an image resolution. An example set of barcode decoding parameters includes all parameters needed to decode a barcode. An example set of barcode decoding parameters includes at least a PPM, a barcode format, and an image resolution.

The barcode decoder 415 determines whether the plurality of barcodes are encoded using at least one of the same barcode size, the same module size, and/or the same barcode format (block 820). The barcode decoder 415 may make the determination at block 820 by, for example, implementing the example flowchart 900 of FIG. 9, the example flowchart 1000 of FIG. 10, and/or the example flowchart 1100 of FIG. 11.

When the plurality of barcodes are encoded using at least one of the same barcode size, the same module size, and/or the same barcode format, the barcode decoder 415 attempts to decode all remaining barcodes using first the determined set of barcode decoding parameters (block 830), and control exits from the example flowchart 800. In some examples, if any of the remaining barcodes fail to successfully decode using the determined set of barcode decoding parameters (block 835), control proceeds to block 840 where the barcode decoder 415 reverts to conventional barcode decoding in which the barcode decoder 415 attempts to decode the unsuccessfully decoded remaining barcodes using one or more other sets of decoding parameters.

Returning to block 825, when not all of the plurality of barcodes are encoded using at least one of the same barcode size, the same module size, and/or the same barcode format, the barcode decoder 415, as is conventional, attempts to decode the remaining barcodes using one or more other sets of decoding parameters.

Figure 9:
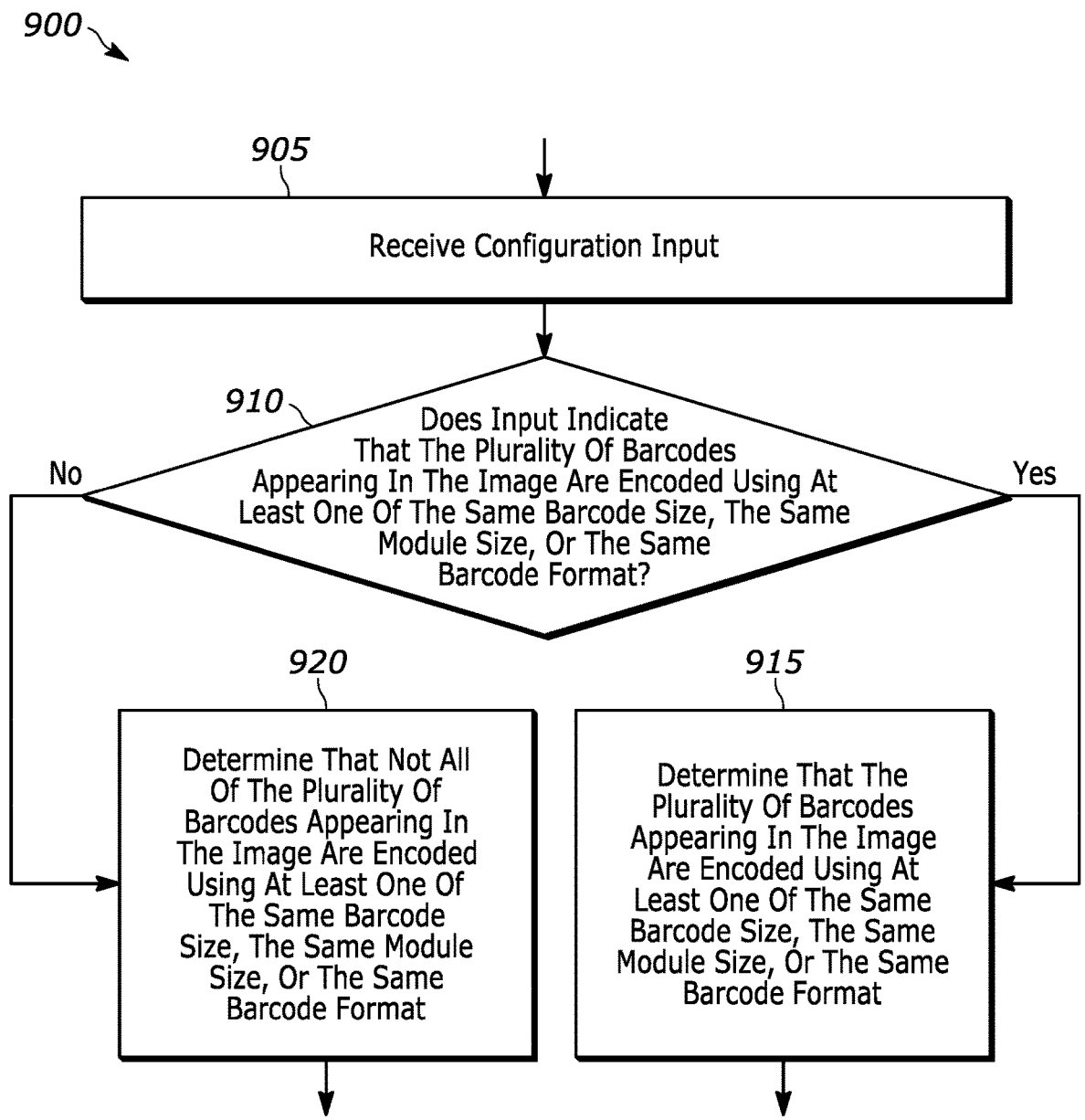
FIG. 9 is a flowchart representative of an example method, hardware logic, machine-readable instructions, or software for determining whether a plurality of barcodes in an image are encoded using at least one of the same barcode size, the same module size and/or the same barcode format, in accordance with embodiments of the disclosure.

FIG. 9 is a flowchart 900 representative of example processes, methods, software, machine-readable instructions, etc. that may be implemented by the system 400 of FIG. 4, the imaging device 605 of FIG. 6, and/or the system 700 of FIG. 7 to determine whether a plurality of barcodes appearing in an image are all encoded using at least one of the same barcode size, the same module size, and/or the same barcode format. The flowchart 900 may be implemented by the processor 420 and/or the barcode decoder 415 to implement block 820 of FIG. 8. Any or all of the blocks of FIG. 9 may be an executable program or portion(s) of an executable program embodied in software and/or machine-readable instructions stored on a non-transitory, machine-readable storage medium for execution by one or more processors such as the processor 1202 of FIG. 12. Additionally and/or alternatively, any or all of the blocks of FIG. 9 may be implemented by one or more hardware circuits structured to perform the corresponding operation(s) without executing software or instructions.

The flowchart 900 of FIG. 9 begins at block 905 with receiving a configuration input from a user via a user interface and/or from a host system. When the configuration inputs indicates that a plurality of barcodes appearing in an image are all encoded using at least one of the same barcode size, the same module size, and/or the same barcode format (block 910), it is determined that the plurality of barcodes are all encoded using at least one of the same barcode size, the same module size, and/or the same barcode format (block 915).

Otherwise, it is determined that not all of the plurality of barcodes are all encoded using at least one of the same barcode size, the same module size, and/or the same barcode format (block 920).

Figure 10:
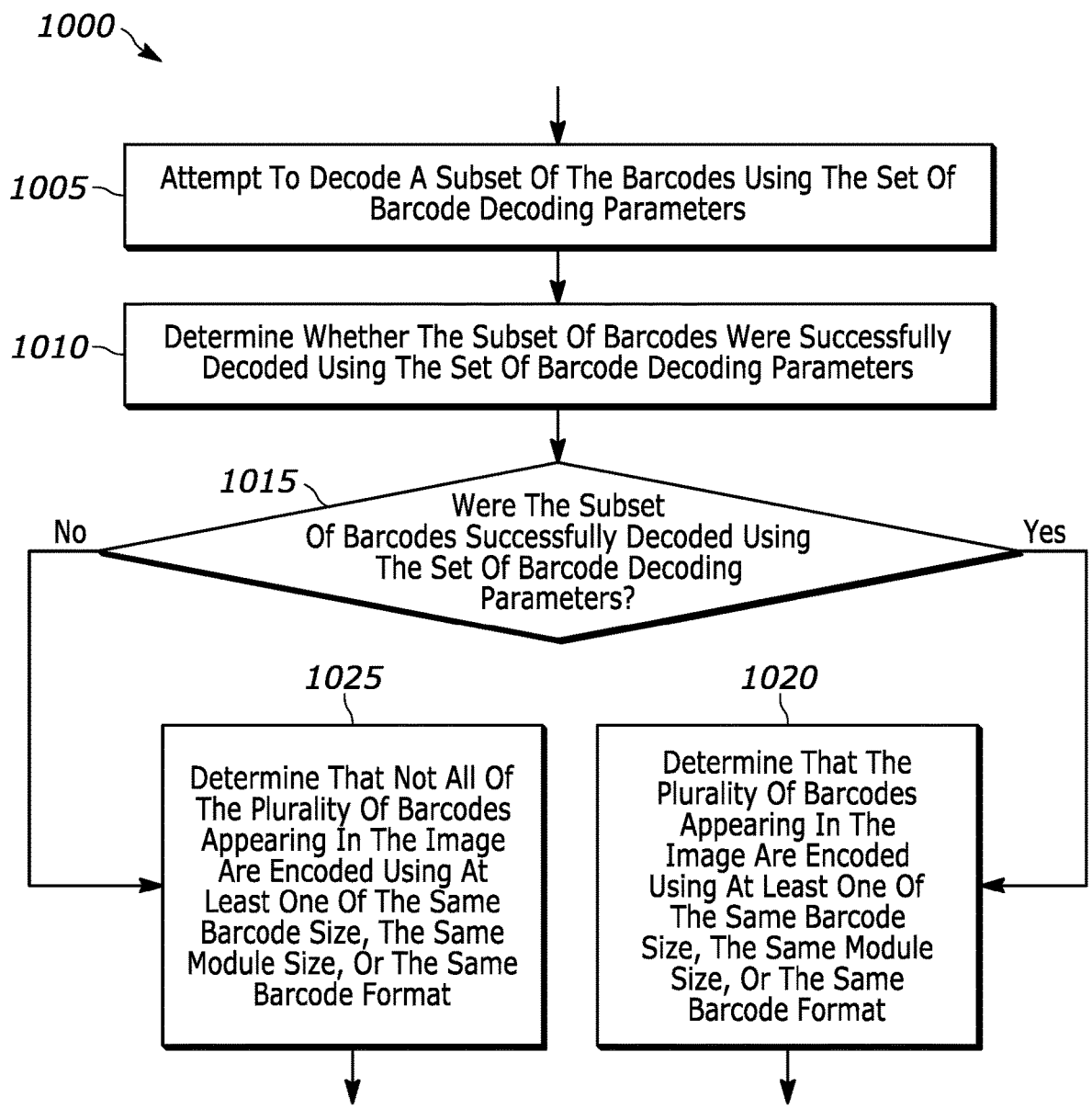
FIG. 10 is a flowchart representative of another example method, hardware logic, machine-readable instructions, or software for determining whether a plurality of barcodes in an image are encoded using at least one of the same barcode size, the same module size and/or the same barcode format, in accordance with embodiments of the disclosure.

FIG. 10 is a flowchart 1000 representative of another example processes, methods, software, machine-readable instructions, etc. that may be implemented by the system 400 of FIG. 4, the imaging device 605 of FIG. 6, and/or the system 700 of FIG. 7 to determine whether a plurality of barcodes appearing in an image are all encoded using at least one of the same barcode size, the same module size, and/or the same barcode format. The flowchart 900 may be implemented by, for example, the barcode decoder 415 to implement block 820 of FIG. 8. Any or all of the blocks of FIG. 10 may be an executable program or portion(s) of an executable program embodied in software and/or machine-readable instructions stored on a non-transitory, machine-readable storage medium for execution by one or more processors such as the processor 1202 of FIG. 12. Additionally and/or alternatively, any or all of the blocks of FIG. 10 may be implemented by one or more hardware circuits structured to perform the corresponding operation(s) without executing software or instructions.

The flowchart 1000 of FIG. 10 begins at block 1005 with a barcode decoder, such as the barcode decoder 415, attempting to decode one or more additional barcodes using the set of barcode decoding parameters used to successfully decode a first barcode at, for example, block 815 of FIG. 8, and determining whether the additional barcodes were successfully decoded with the set of barcode decoding parameters (block 1010).

When the one or more additional barcodes were successfully decoded using the set of barcode decoding parameters (block 1015), the barcode decoder 415 determines that the plurality of barcodes are all encoded using at least one of the same barcode size, the same module size, and/or the same barcode format (block 1020).

Otherwise, the barcode decoder 415 determines that not all of the plurality of barcodes are all encoded using at least one of the same barcode size, the same module size, and/or the same barcode format (block 1025).

Figure 11:
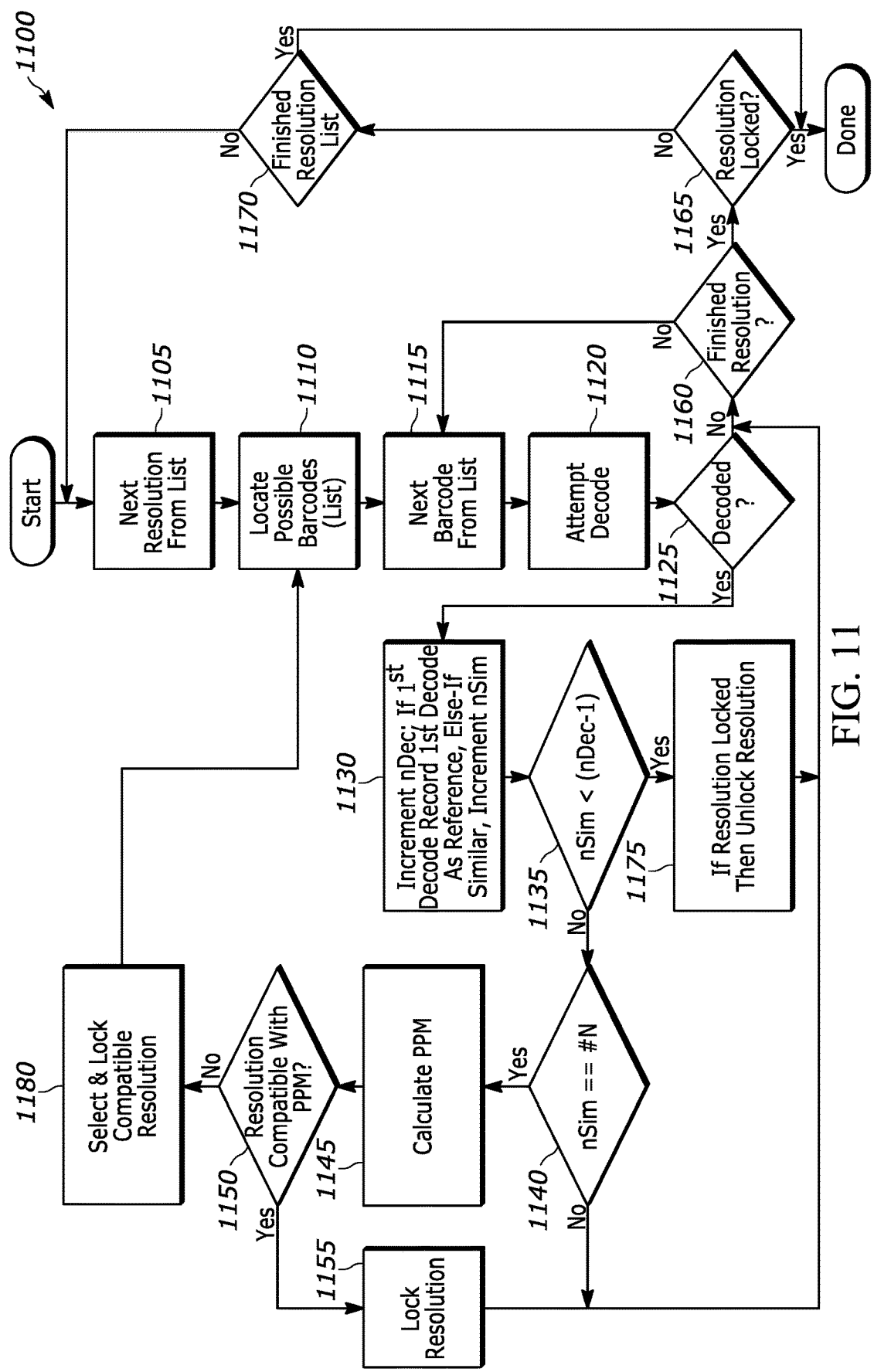
FIG. 11 is a flowchart representative of yet another example method, hardware logic, machine-readable instructions, or software for determining whether a plurality of barcodes in an image are encoded using at least one of the same barcode size, the same module size and/or the same barcode format, in accordance with embodiments of the disclosure.

FIG. 11 is a flowchart 1100 representative of example processes, methods, software, machine-readable instructions, etc. that may be implemented by the system 400 of FIG. 4, the imaging device 605 of FIG. 6, and/or the system 700 of FIG. 7 to determine a set of barcode decoding parameters for decoding a plurality of barcodes appearing in an image. The flowchart 1100 may be implemented by, for example, the barcode decoder 415 to implement block 820 of FIG. 8. Any or all of the blocks of FIG. 11 may be an executable program or portion(s) of an executable program embodied in software and/or machine-readable instructions stored on a non-transitory, machine-readable storage medium for execution by one or more processors such as the processor 1202 of FIG. 12. Additionally and/or alternatively, any or all of the blocks of FIG. 11 may be implemented by one or more hardware circuits structured to perform the corresponding operation(s) without executing software or instructions.

The flowchart 1100 of FIG. 11 begins at block 1105 with a barcode decoder, such as the barcode decoder 415, obtaining image data representing an image of an environment in a FOV in which a plurality of barcodes appear, wherein the image data is captured at selected image resolution of a plurality of image resolutions at which image data was captured. At block 1105, a count of successfully decoded barcodes nDec is set of zero, and a count of additionally successfully decoded barcodes is set to zero. The barcode decoder 415 identifies a plurality of possible locations of barcodes in the image data (block 1110), and selects a possible barcode location for consideration (block 1115). The barcode decoder 415 attempts to decode a barcode at the selected location (block 1120).

If a barcode is successfully decoded (block 1125), (i) the count of successfully decoded barcodes nDec is incremented by one, (ii) if this is the first successfully decoded barcode at the currently selected resolution, the set of barcode decoding parameters used to decode the barcode is saved as a reference set of barcode decoding parameters, and (iii) if this is another barcode successfully decoded with the reference set of barcode decoding parameters at the currently selected resolution, the count of similarly decoded barcodes nSim is incremented by one (block 1130).

If nSim is equal to (nDec−1) (block 1135), and nSim satisfies a criteria (e.g., is equal to a predetermined threshold N) (block 1140), then the barcode decoder 415 calculates a PPM based on the reference set of barcode decoding parameters (block 1145), and determines if the currently selected resolution is compatible with the PPM (block 1150). If the resolution is compatible (block 1150), the currently selected resolution is locked (block 1155), and the barcode decoder 415 determines whether it has considered all possible barcode locations determined at block 1110, that is, attempted to decode barcodes at all of the possible barcode locations (block 1160). If all possible barcode locations have been considered (block 1160), and if the current resolution is locked (block 1165), then control exits from the example flowchart 1100 having determined that the plurality of barcodes are all encoded using at least one of the same barcode size, the same module size, and/or the same barcode format.

Returning to block 1165, if the current resolution is not locked (block 1165), then the barcode decoder 415 determines whether each image resolution has been tried (block 1170). If all image resolutions have been tried (block 1170), control exits from the flowchart 1100. Otherwise (block 1170), control returns to block 1105 to obtain image data captured at another image resolution.

Returning to block 1135, If nSim is not equal to (nDec−1) (e.g., is less than) (block 1135), then the currently selected resolution is unlocked if it is locked (block 1175), and control proceeds to block 1160 to determine if all possible barcode locations at the currently selected resolution have been considered.

Returning to block 1150, if the currently selected resolution is not compatible with the calculated PPM (block 1150), then the barcode decoder 415 selects and locks a compatible image resolution, and control proceeds to block 1110 to determine possible barcode locations at the compatible image resolution.

Figure 12:
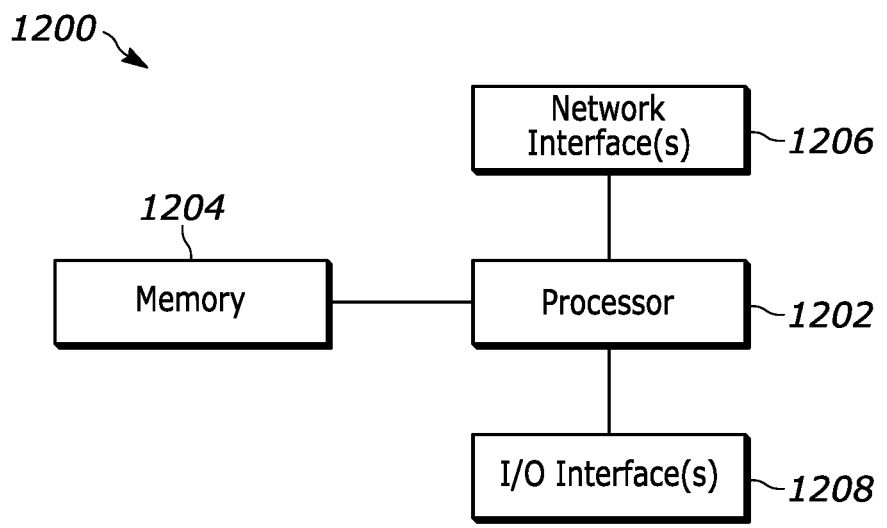
FIG. 12 is a block diagram of an example logic circuit for implementing example methods and/or operations described herein.

FIG. 12 is a block diagram representative of an example logic circuit capable of implementing, for example, one or more components of the example system 400 of FIG. 4, the example imaging device 605 of FIG. 6, and/or the example system 700 of FIG. 7 for determining and using a set of barcode decoding parameters to decode a plurality of barcodes appearing in one or more captured images. The example logic circuit of FIG. 12 is a processing platform 1200 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 1200 of FIG. 12 includes a processor 1202 such as, for example, one or more microprocessors, controllers, and/or any suitable type of processor. The example processing platform 1200 of FIG. 12 includes memory (e.g., volatile memory, non-volatile memory) 1204 accessible by the processor 1202 (e.g., via a memory controller, not shown for clarity of illustration). The example processor 1202 interacts with the memory 1204 to obtain, for example, machine-readable instructions stored in the memory 1204 corresponding to, for example, the operations represented by the flowcharts of this disclosure. Additionally or alternatively, machine-readable instructions corresponding to the example operations described herein may be stored on one or more removable media (e.g., a compact disc (CD), a digital versatile disc (DVD), removable flash memory, etc.) that may be coupled to the processing platform 1200 to provide access to the machine-readable instructions stored thereon.

The processing platform 1200 of FIG. 12 includes one or more communication interfaces such as, for example, one or more network interfaces 1206, and/or one or more input/output (I/O) interfaces 1208. The communication interface(s) enable the processing platform 1200 of FIG. 12 to communicate with, for example, another device (e.g., the host computing device or system 610), system, host system (e.g., a POS system, a point-of-transaction system, an inventory management system), datastore, database, and/or any other machine.

The example processing platform 1200 of FIG. 12 also includes the network interface(s) 1206 to enable communication with other machines via, for example, one or more networks. The example network interface 1206 includes any suitable type of communication interface(s) (e.g., wired and/or wireless interfaces) configured to operate in accordance with any suitable protocol(s).

The example, processing platform 1200 of FIG. 12 also includes the input/output (I/O) interface(s) 1208 to enable receipt of user input and communication of output data to the user.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 50%, in another embodiment within 12%, in another embodiment within 5% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Use of "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise. A device or structure that is "configured" in a certain way is configured in at least that way, but may also be configured in ways that are not listed. Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The claims are:

1. A method, comprising:
obtaining, from an image sensor, image data representing an image of an environment appearing within a field of view of an imaging device that includes the image sensor, wherein a plurality of barcodes appear in the image;
decoding a first barcode of the plurality of barcodes from the image data;
determining a set of barcode decoding parameters used to successfully decode the first barcode;
determining whether the plurality of barcodes appearing in the image are encoded using at least one of a same barcode size, a same module size, or a same barcode format; and
when the plurality of barcodes appearing in the image are encoded using at least one of the same barcode size, the same module size, or the same barcode format, attempting to decode all remaining barcodes of the plurality of barcodes from the image data using first the set of barcode decoding parameters.

2. The method of claim 1, wherein the set of barcode decoding parameters includes all configurable decoding parameters used to successfully decode the first barcode.

3. The method of claim 1, wherein the set of barcode decoding parameters includes at least a pixels per module, a barcode format, and an image resolution.

4. The method of claim 1, further comprising:
when not all of the plurality of barcodes appearing in the image are encoded using at least one of the same barcode size, the same module size, or the same barcode format, attempting to decode the remaining barcodes of the plurality of barcodes from the image data using one or more other sets of barcode decoding parameters.

5. The method of claim 1, wherein determining whether the plurality of barcodes appearing in the image are encoded using at least one of the same barcode size, the same module size, or the same barcode format includes:
receiving a configuration input indicating whether the plurality of barcodes appearing in the image are encoded using at least one of the same barcode size, the same module size, or the same barcode format.

6. The method of claim 5, wherein the configuration input is received via a user interface.

7. The method of claim 1, wherein determining whether the plurality of barcodes appearing in the image are encoded using at least one of the same barcode size, the same module size, or the same barcode format includes:
attempting to decode a subset of the plurality of barcodes using first the set of barcode decode parameters;

determining whether the subset of the plurality of barcodes were each successfully decoded using the set of barcode decode parameters; and when the subset of the plurality of barcodes were each successfully decoded using the set of barcode decode parameters, determining that the plurality of barcodes appearing in the image are encoded using at least one of the same barcode size, the same module size, or the same barcode format, wherein the remaining barcodes of the plurality of barcodes excludes the first barcode and the subset of the plurality of barcodes.

8. The method of claim 7, further including:
when not all of the subset of barcodes can be successfully decoded with the set of barcode decoding parameters, determining that not all of the plurality of barcodes appearing in the image are encoded using at least one of the same barcode size, the same module size, or the same barcode format.

9. The method of claim 8, further including:
when not all of the plurality of barcodes appearing in the image are encoded using at least one of the same barcode size, the same module size, or the same barcode format, attempting to decode the remaining barcodes of the plurality of barcodes from the image data using one or more other sets of barcode decoding parameters.

10. An apparatus comprising:
an interface to receive, from an image sensor, image data representing an image of an environment appearing within a field of view of the image sensor;
a barcode decoder; and
a processor configured to:
determine whether a plurality of barcodes appearing in the image are encoded using at least one of a same barcode size, a same module size, or a same barcode format;
cause the barcode decoder to decode a first barcode of the plurality of barcodes from image data, and determine a set of barcode decoding parameters used to successfully decode the first barcode; and
when the plurality of barcodes appearing in the image are encoded using at least one of the same barcode size, the same module size, or the same barcode format, cause the barcode to attempt to decode all remaining barcodes of the plurality of barcodes from the image data starting with the set of barcode decoding parameters.

11. The apparatus of claim 10, wherein the set of barcode decoding parameters includes all configurable decoding parameters used to successfully decode the first barcode.

12. The apparatus of claim 10, wherein the set of barcode decoding parameters includes at least a pixels per module, a barcode format, and an image resolution.

13. The apparatus of claim 10, wherein the processor is configured to:
determine whether the plurality of barcodes appearing in the image are encoded using at least one of the same barcode size, the same module size, or the same barcode format in response to receiving a configuration input indicating whether the plurality of barcodes appearing in the image are encoded using at least one of the same barcode size, the same module size, or the same barcode format; and
cause the barcode to attempt to decode all remaining barcodes of the plurality of barcodes from the image data starting with the set of barcode decoding parameters by providing the indication to the barcode decoder.

14. A non-transitory, computer-readable, storage medium storing computer-readable instructions that, when executed by one or more processors, cause a barcode decoder to:
obtain, from an image sensor, imaging data representing an image of an environment appearing within a field of view of the image sensor;
determine whether a plurality of barcodes appearing in the image are encoded using at least one of a same barcode size, a same module size, or a same barcode format;
decode a first barcode of the plurality of barcodes from the image data;
determine a set of barcode decoding parameters used to successfully decode the first barcode; and
when the plurality of barcodes appearing in the image are encoded using at least one of the same barcode size, the same module size, or the same barcode format, attempt to decode all remaining barcodes of the plurality of barcodes from the image data using first the set of barcode decoding parameters.

15. The storage medium of claim 14, wherein the set of barcode decoding parameters includes all configurable decoding parameters used to successfully decode the first barcode.

16. The storage medium of claim 14, wherein the set of barcode decoding parameters includes at least a pixels per module, a barcode format, and an image resolution.

17. The storage medium of claim 14, wherein the instructions, when executed by the one or more processors, cause the barcode decoder to:
when not all of the plurality of barcodes appearing in the image are encoded using at least one of the same barcode size, the same module size, or the same barcode format, attempting to decode the remaining barcodes of the plurality of barcodes from the image data using one or more other sets of barcode decoding parameters.

18. The storage medium of claim 14, wherein the instructions, when executed by the one or more processors, cause the barcode decoder to determine whether the plurality of barcodes appearing in the image are encoded using at least one of the same barcode size, the same module size, or the same barcode format by:
receiving a configuration input indicating whether the plurality of barcodes appearing in the image are encoded using at least one of the same barcode size, the same module size, or the same barcode format.

19. The storage medium of claim 14, wherein the instructions, when executed by the one or more processors, cause the barcode decoder to determine whether the plurality of barcodes appearing in the image are encoded using at least one of the same barcode size, the same module size, or the same barcode format by:
attempting to decode a subset of the plurality of barcodes using the set of barcode decode parameters;
determining whether the subset of the plurality of barcodes were each successfully decoded using the set of barcode decode parameters; and
when the subset of the plurality of barcodes were each successfully decoded using the set of barcode decode parameters, determining that the plurality of barcodes appearing in the image are encoded using at least one of the same barcode size, the same module size, or the same barcode format, wherein the remaining barcodes of the plurality of barcodes excludes the first barcode and the subset of the plurality of barcodes.

20. The storage medium of claim 14, wherein the instructions, when executed by the one or more processors, cause the barcode decoder to:
when not all of the plurality of barcodes appearing in the image are encoded using at least one of the same barcode size, the same module size, or the same barcode format, attempt to decode the remaining barcodes of the plurality of barcodes from the image data using one or more other sets of barcode decoding parameters.

* * * * *